United States Patent
Tan et al.

(10) Patent No.: US 10,272,573 B2
(45) Date of Patent: Apr. 30, 2019

(54) CONTROL SYSTEM AND METHOD FOR APPLYING FORCE TO GRASP A BRAKE LEVER

(71) Applicant: General Electric Company, Schenectady, NY (US)

(72) Inventors: Huan Tan, Niskayuna, NY (US); John Michael Lizzi, Niskayuna, NY (US); Douglas Forman, Niskayuna, NY (US); Charles Burton Theurer, Alplaus, NY (US); Omar Al Assad, Niskayuna, NY (US); Romano Patrick, Atlanta, GA (US); Balajee Kannan, Niskayuna, NY (US); Yonatan Gefen, Niskayuna, NY (US)

(73) Assignee: GE GLOBAL SOURCING LLC, Norwalk, CT (US)

(*) Notice: Subject to any disclaimer, the term of this patent is extended or adjusted under 35 U.S.C. 154(b) by 65 days.

(21) Appl. No.: 15/058,560

(22) Filed: Mar. 2, 2016

(65) Prior Publication Data
US 2017/0173790 A1    Jun. 22, 2017

Related U.S. Application Data

(60) Provisional application No. 62/269,523, filed on Dec. 18, 2015, provisional application No. 62/269,425, (Continued)

(51) Int. Cl.
*G05B 15/00* (2006.01)
*G05B 19/00* (2006.01)
(Continued)

(52) U.S. Cl.
CPC ............. *B25J 13/003* (2013.01); *B25J 9/162* (2013.01); *B25J 9/1612* (2013.01); *B25J 9/1661* (2013.01);
(Continued)

(58) Field of Classification Search
CPC ....... B25J 13/085; B25J 19/021; B25J 9/1612; B25J 9/1661; B25J 9/1664
(Continued)

(56) References Cited

U.S. PATENT DOCUMENTS 4,598,942 A    7/1986    Shum et al.
4,925,312 A    5/1990    Onaga et al.
(Continued)

OTHER PUBLICATIONS

Xianyi Yang et al., "A neural network approach to real-time motion planning and control of robot manipulators". Oct. 12-15, 1999, Systems, Man, and Cybernetics, 1999. IEEE SMC '99 Conference Proceedings. vol. 4 pp. 674-679 Conference,Tokyo.
(Continued)

*Primary Examiner* — Harry Y Oh
(74) *Attorney, Agent, or Firm* — Christopher R. Carroll; The Small Patent Law Group LLC

(57) ABSTRACT

Systems and methods are provided for an automation system. The systems and methods calculate a motion trajectory of a manipulator and an end-effector. The end-effector is configured to grasp a target object. The motion trajectory defines successive positions of the manipulator and the end-effector along a plurality of via-points toward the target object. The systems and methods further acquire force/torque (F/T) data from an F/T sensor associated with the end-effector, and adjusts the motion trajectory based on the F/T data.

17 Claims, 3 Drawing Sheets

Related U.S. Application Data filed on Dec. 18, 2015, provisional application No. 62/269,377, filed on Dec. 18, 2015, provisional application No. 62/269,481, filed on Dec. 18, 2015.

(51) Int. Cl.

| | | |
|---|---|---|
| *B25J 13/00* | (2006.01) | |
| *B60T 15/54* | (2006.01) | |
| *B25J 9/16* | (2006.01) | |
| *B25J 13/08* | (2006.01) | |
| *B25J 11/00* | (2006.01) | |
| *B25J 19/02* | (2006.01) | |
| *B60T 7/16* | (2006.01) | |
| *B60T 15/04* | (2006.01) | |
| *G06T 7/70* | (2017.01) | |
| *H04N 5/225* | (2006.01) | |
| *H04N 7/18* | (2006.01) | |

(52) U.S. Cl.
CPC ........... *B25J 9/1664* (2013.01); *B25J 9/1666* (2013.01); *B25J 9/1679* (2013.01); *B25J 9/1694* (2013.01); *B25J 9/1697* (2013.01); *B25J 11/00* (2013.01); *B25J 13/085* (2013.01); *B25J 19/021* (2013.01); *B25J 19/023* (2013.01); *B60T 7/16* (2013.01); *B60T 15/048* (2013.01); *B60T 15/54* (2013.01); *G06T 7/70* (2017.01); *H04N 5/2253* (2013.01); *H04N 7/181* (2013.01); *G05B 2219/40039* (2013.01); *G05B 2219/40586* (2013.01); *G05B 2219/40613* (2013.01); *Y10S 901/01* (2013.01)

(58) Field of Classification Search
USPC ........................................................ 700/253
See application file for complete search history.

(56) References Cited

U.S. PATENT DOCUMENTS

| | | | |
|---|---|---|---|
| 4,974,210 A | 11/1990 | Lee | |
| 5,673,367 A | 9/1997 | Buckley | |
| 6,489,741 B1* | 12/2002 | Genov | B25J 9/1615 |
| | | | 318/561 |
| 7,888,900 B2 | 2/2011 | Okamoto et al. | |
| 8,335,591 B2 | 12/2012 | Takahashi | |
| 8,527,092 B2* | 9/2013 | Hacker | B25J 9/1641 |
| | | | 700/1 |
| 8,538,583 B2 | 9/2013 | Kim et al. | |
| 9,186,795 B1* | 11/2015 | Edsinger | B25J 9/1694 |
| 9,656,388 B2* | 5/2017 | Nammoto | B25J 9/1612 |
| 2005/0195409 A1* | 9/2005 | Watanabe | B25J 9/1697 |
| | | | 356/614 |
| 2008/0027580 A1* | 1/2008 | Zhang | B25J 9/1633 |
| | | | 700/245 |
| 2008/0033410 A1* | 2/2008 | Rastegar | A61B 18/20 |
| | | | 606/9 |
| 2009/0285664 A1* | 11/2009 | Kim | B25J 9/1612 |
| | | | 414/730 |
| 2010/0076631 A1* | 3/2010 | Mian | G05D 1/0229 |
| | | | 701/19 |
| 2010/0152896 A1* | 6/2010 | Komatsu | B25J 9/0003 |
| | | | 700/258 |
| 2011/0015649 A1* | 1/2011 | Anvari | A61B 34/30 |
| | | | 606/130 |
| 2011/0211938 A1* | 9/2011 | Eakins | B25J 9/1687 |
| | | | 414/738 |
| 2011/0288667 A1* | 11/2011 | Noda | B25J 9/1661 |
| | | | 700/98 |
| 2012/0004774 A1* | 1/2012 | Umetsu | B25J 15/0009 |
| | | | 700/254 |
| 2012/0197438 A1* | 8/2012 | Ogami | B25J 9/1682 |
| | | | 700/258 |
| 2013/0184869 A1* | 7/2013 | Inazumi | B25J 9/1633 |
| | | | 700/260 |
| 2013/0238132 A1* | 9/2013 | Kurth | B25J 9/1612 |
| | | | 700/260 |
| 2014/0107843 A1* | 4/2014 | Okazaki | B25J 13/085 |
| | | | 700/260 |
| 2014/0114479 A1* | 4/2014 | Okazaki | B25J 13/085 |
| | | | 700/253 |
| 2014/0163730 A1* | 6/2014 | Mian | B25J 9/16 |
| | | | 700/248 |
| 2015/0094855 A1* | 4/2015 | Chemouny | G05B 19/423 |
| | | | 700/259 |
| 2015/0164361 A1* | 6/2015 | Lunner | A61B 5/6817 |
| | | | 600/379 |
| 2015/0251314 A1* | 9/2015 | Nammoto | B25J 9/1612 |
| | | | 700/259 |
| 2016/0075030 A1* | 3/2016 | Takahashi | B25J 9/1694 |
| | | | 700/253 |
| 2016/0089789 A1* | 3/2016 | Sato | B25J 11/005 |
| | | | 700/254 |
| 2016/0107316 A1* | 4/2016 | Alt | B25J 9/1697 |
| | | | 700/259 |
| 2016/0318187 A1 | 11/2016 | Tan et al. | |
| 2016/0319680 A1 | 11/2016 | Roman-Morales et al. | |
| 2017/0165839 A1 | 6/2017 | Tan et al. | |

OTHER PUBLICATIONS

Khatib O, "A unified approach for motion and force control of robot manipulators: The operational space formulation". IEEE Journal of Robotics and Automation, Feb. 1987, vol. 3 Issue: 1 pp. 43-53.

Assad et al., GE Co-pending U.S. Appl. No. 62/269,523, "Control System and Method for Brake Bleeding", filed Dec. 18, 2015.

Tan et al., GE Co-pending U.S. Appl. No. 62/269,377, "System and Method for Communicating With an Operator of the System", filed Dec. 18, 2015.

* cited by examiner

CONTROL SYSTEM AND METHOD FOR APPLYING FORCE TO GRASP A BRAKE LEVER

CROSS-RELATED TO RELATED APPLICATIONS

This application claims priority to U.S. Provisional Application Nos. 62/269,523; 62/269,425; 62/269,377; and 62/269,481, all of which were filed on 18 Dec. 2015, and the entire disclosures of which are incorporated herein by reference.

FIELD

The subject matter described herein relates to systems for controlling a manipulator such as a robotic arm to grasp a brake lever of a vehicle.

BACKGROUND

Some vehicles include brake systems that operate based on pressure differentials in fluid disposed in the brake systems. For example, air brakes in some vehicles (e.g., rail vehicles) may disengage when the air pressure in the air brakes is decreased. The air brakes in such vehicles may be released in certain environments in order to perform operations on the vehicles. The air brakes in rail vehicles, for example, may be disengaged while in a rail yard in order to more freely roll the rail vehicles around within the rail yard.

In order to disengage the air brakes of vehicles, a human operator may pull on a lever that opens a valve of the air brakes. The valve is opened and the air within the brake system is bled (e.g., the air flows out of the brake system) to reduce the pressure within the brake system and disengage the air brakes. Use of human operators in a rail yard, however, includes many problems. The operations taking place in a rail yard pose safety risks to the human operators. Additionally, the use of human operators can involve increased cost relative to automated systems.

But, automated systems pose problems as well. Although applicant is unaware of any automated system that can bleed air brakes of a vehicle, a critical step is for the automated system to grasp the brake lever. To grasp the brake lever, the automated system relies on an estimation of the brake lever position and a position/velocity control of an end-effector to grasp the brake lever. However, imprecise or inaccurate estimations of the brake lever position, for example, due to noises in the measurement, error in the recognition and segmentation of the brake lever, and/or the like, may have the end-effector have an improper grasp of the brake lever. The improper grasp may result in damaging the automated system such as the end-effector and/or prohibit the automated system from grasping the brake lever. Thus, there is a need to have an automated system with a force and/or torque control loop to enable the automated system to grasp the lever firmly with imprecise or inaccurate estimations.

BRIEF DESCRIPTION

In one embodiment an automation system is provided. The automation system includes an end-effector that includes a plurality of arms. The end-effector is configured to grasp a target object based on a motion trajectory. The automation system also includes a manipulator that includes one or more joints. The end-effector is coupled to the manipulator. The one or more joints are configured to move the end-effectors relative to the target object based on the motion trajectory. The automation system also includes a force/torque (F/T) sensor that acquires F/T data associated with the end-effector. The automation system also includes a control circuit receiving the F/T data. The controller circuit adjusts the motion trajectory based on the F/T data.

In one embodiment a method for controlling an automation system is provided. The method calculates a motion trajectory of a manipulator and an end-effector. The end-effector is configured to grasp a target object. The motion trajectory defines successive positions of the manipulator and the end-effector along a plurality of via-points toward the target object. The method also acquires force/torque (F/T) data from an FIT sensor associated with the end-effector, and adjusts the motion trajectory based on the F/T data.

BRIEF DESCRIPTION OF THE DRAWINGS

The inventive subject matter described herein will be better understood from reading the following description of non-limiting embodiments, with reference to the attached drawings, wherein below.

DETAILED DESCRIPTION

Figure 1:
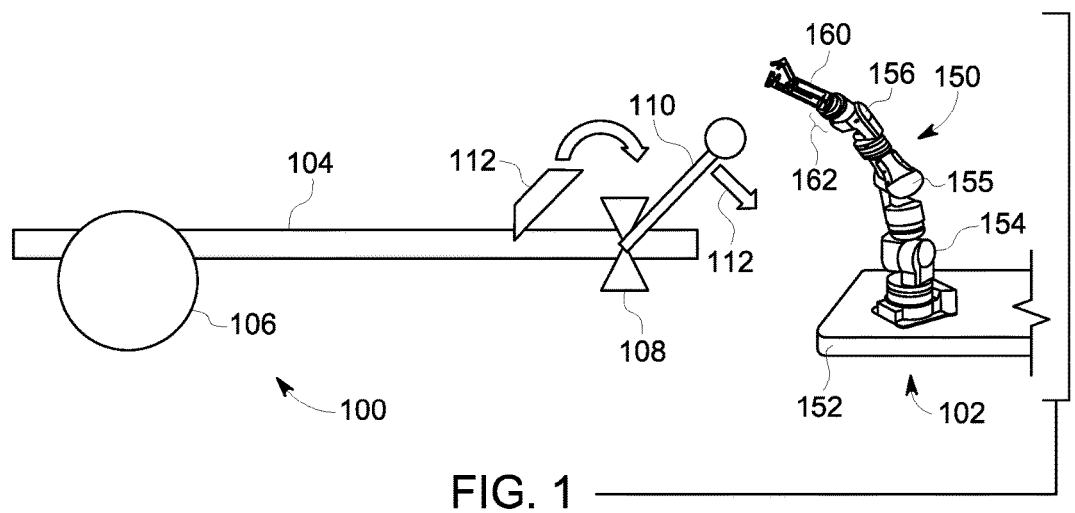
FIG. 1 schematically illustrates a brake system and an automation system according to one embodiment.

Reference will be made below in detail to example embodiments of the inventive subject matter, examples of which are illustrated in the accompanying drawings. Wherever possible, the same reference numerals used throughout the drawings refer to the same or like parts. Although embodiments of the inventive subject matter are described with respect to vehicles and vehicle systems such as trains, locomotives, and other rail vehicles, embodiments of the inventive subject matter are also applicable for use with vehicles generally, such as off-highway vehicles (e.g., vehicles that are not designed or permitted to travel on public roadways), agricultural vehicles, and/or transportation vehicles, each of which may include a brake system.

The systems and methods described herein are generally for a grasping control system, such as an automated system (e.g., a robot) for grasping a break lever, such as one of the system described in U.S. Provisional Application No. 62/269,425, which was filed on Dec. 18, 2015 and is incorporated by reference in its entirety. The automated system may use feedback from one or more sensors to position a manipulator and an end-effector to grasp the break lever. These sensors may include, but are not limited to a force and/or torque sensor installed on an end-effector of the manipulator, position feedback of the robotic arm (e.g., encoders that sense displacement of an arm and/or lever), a peripheral sensor, and/or the like. A computer, such as a controller, reads the sensor inputs and adjusts a position and/or orientation of the end-effector based on the sensor inputs. The controller may continually adjust in real-time the position and/or orientation of the end-effector to enable the automated system to firmly grasp the brake lever. Thereby, a technical effect of the various embodiments described herein provide for real-time planning and adjusting a position and/or orientation of the end-effector. Based on the sensor inputs the controller may generate a plurality of closed loops to control movement and/or drive the manipulator and the end-effector. The sensor inputs may be utilized by the controller as feedback information relating to the automated system and the environment (e.g., area surrounding the automated system, task space) to adjust the manipulator and/or the end-effector.

In particular embodiments, the systems and methods described herein may be used to perform a brake-bleeding task, such as the brake-bleeding tasks described in U.S. Provisional Application Nos. 62/269,523; 62/269,425; 62/269,377; and 62/269,481, the entire disclosures of which are incorporated herein by reference.

For example, the systems and methods described herein can be used generally for closed loop control of a robotic arm to locate and actuate a brake lever to bleed a brake system, such as one of the systems described in U.S. Provisional Application No. 62/269,481, which was filed on Dec. 18, 2015 and is incorporated herein by reference in its entirety. For example, even with a perception error that is relatively large, such as 2-5 cm, the error decreases as the robotic arm approaches the brake lever due to closed loop feedback from one or more sensors. These sensors can include, but are not limited to, an imaging sensor installed on the robotic arm that moves the brake lever, a force and/or torque sensor installed on the robotic arm, and/or position feedback of the robotic arm (e.g., encoders that sense displacement of the arm). A computer, such as a controller, reads the sensor inputs and provides the following outputs based on the inputs: the location of the brake lever, the current position and movement of the robotic arm, and/or the forces and/or torques applied by the robotic arm (as the arm moves and actuates the brake lever). The sensors provide the outputs to the computer as the robotic arm moves, and updated information is used to revise or adjust the movement of the robotic arm towards the brake lever, reducing the error between the perceived position of the brake lever relative to the position of the robotic arm. Thus, the systems and methods described herein control the robotic arm to increase the efficiency of the brake bleeding task by reducing first attempt failures to bleed the brake system without compromising speed.

The processing speed of perception information acquired by the imaging sensor may be relatively slow, such as around 0.2 Hz. In order to synchronize the perception aspect of the system with the control aspect of the system which conveys control signals to the robotic arm, one or more embodiments described herein implement a step-wise visual servo control algorithm during the brake bleeding task. For example, a motion prediction model may be used to estimate the position of the brake lever relative to the robotic arm as the robotic arm moves towards the brake lever. The motion prediction model provides feedback for closed loop control of the robotic arm. But, since the frequency of the perception is slow, the feedback information may not be available as often as required for the motion prediction model alone to be used to accurately guide the robotic arm. In one or more embodiments, an optical-flow prediction model is used as an additional environmental information source for estimating the relative position and movement between the robotic arm and the brake lever. The estimation provided by the optical-flow prediction model increases the frequency of perception and synchronizes the perception aspect of the system with the control aspect because the estimated variables of location and/or position may be used in control calculations when the slower, but more accurate, perception information is not available.

The systems and methods described herein can be used to validate a brake release action using feedback from one or more sensors, such as the systems and methods described in U.S. Provisional Application No. 62/269,523, which was filed on Dec. 18, 2015 and is incorporated herein by reference in its entirety. These sensors can include, but are not limited to a force and/or torque sensor installed on a robotic arm that moves a brake lever, position feedback of the robotic arm (e.g., encoders that sense displacement of the arm and/or lever), and/or acoustic measurement of the air release using one or more microphones. A computer, such as a controller, reads the sensor inputs and provides the following outputs based on the inputs: whether the brake is released (and, optionally, a confidence value or index indicative of a probability that the brake was released) and/or whether the brake was not released and (and, optionally, a confidence value or index indicative of a probability that the brake was not released). The action of pulling or pushing the brake lever can provide a direct feedback measured as an amount of lever (or rod) displacement and/or an amount of force and torque applied on the lever in several or all directions. The action of pulling or pushing the brake lever can provide an indirect feedback measured as acoustic sound of the air released via a brake valve.

The act of bleeding a brake system can be associated with a priori predicted values of these feedbacks. For example, the sensor feedback can be monitored while attempting to bleed the brake systems of a large sample of vehicles. Based on the sensor feedbacks from this sample and whether the brake systems were or were not released, the probabilities of whether a brake system on other vehicles is or is not released can be determined. For example, the measured difference between the sensor feedbacks from the sample and from a current brake system can be used to validate the brake release and provide the confidence interval (e.g., the confidence value or index). The use of the confidence value or index is used to provide an accurate estimation or validation of whether the brake system was bled. Because there are no known sensors on rail cars to indicate whether an air brake has been released, the systems and methods described herein meet a need by determining whether the air brake is released.

Embodiments may also include systems and methods for communicating information from a control system (e.g., a robotic control system) to an operator of the control system, such as the systems and methods described in U.S. Provisional Application No. 62/269,377, which was filed on Dec. 18, 2015 and is incorporated herein by reference in its entirety. The operator may be a human operator or another system. In some embodiments, the other system may be a supervisor system that is configured to supervise a plurality of control systems or the other system may be similarly configured or may be identical to the control system.

The information communicated to the operator from the control system may be information relating to a task that is being performed by the control system, such as tasks described herein. The communication may be through a system interface that includes hardware and software for communicating the information. For example, the system interface may include a collection of different physical units, such as user displays, light sources, and audio-generating devices (e.g., speakers, horns, and the like). The information may be in the form of visual signals, audible signals, or tactile signals.

FIG. 1 schematically illustrates a brake system 100 and an automation system 102 (e.g., a mobile robot) according to one embodiment. The brake system 100 may be disposed onboard one or more vehicles, such as rail vehicles, automobiles, or the like. The brake system 100 may operate on a pressure differential within one or more conduits 104 of the brake system 100. When the pressure of a fluid, such as air, in the conduits 104 is below a designated threshold or when the pressure drops by at least a designated amount, the brake system 100 engages brakes 106 (e.g., air brakes) of the brake system 100. Although only one brake 106 is shown in FIG. 1, the brake system 100 may include several brakes 106.

The conduit 104 is connected with a valve 108 that closes to retain the fluid within the conduit 104. The valve 108 can be opened to release (e.g., bleed) the fluid out of the conduit 104 and brake system 100. Once the pressure of the fluid in the conduit 104 and brake system 100 drops by or below a designated amount, the brakes 106 of the brake system 100 release. The vehicle having the brake system 100 may then freely roll with the brakes 106 being disengaged.

The valve 108 can be actuated by moving a brake lever 110. The brake lever 110 may be pulled or pushed (e.g., actuated) to open the valve 108. For example, the brake lever 110 may be pulled in a direction of an arrow 112 to open the valve 108. Releasing the brake lever 110 may cause the valve 108 to close. It should be noted in various other embodiments, the brake lever 110 may actuate the valve 108 by moving the brake lever 110 in alternative directions than shown by the arrow 112.

A latch 112 of the brake system 100 may move under the force of a spring or other device to engage the opened valve 108 and keep the valve 108 open. For example, after pulling the brake lever 110 to open the valve 108, the latch 112 may rotate or otherwise move to a position that holds the valve 108 open. The brake lever 110 may then be released while the valve 108 is held open by the engaged latch 112.

In accordance with one embodiment of the inventive subject matter described herein, the automation system 102 may position an end-effector 160 to grasp and actuate the brake lever 110. The automation system 102 may be a robot, for example, the automation system 102 may be configured to be a rail yard robot. The automation system 102 may include a movable base 152 and a manipulator 150. The movable base 152 may enable the automation system 102 to move within an environment external to and surrounding the automation system 102. For example, the movable base 152 may include a plurality of wheels (not shown) which rotate to allow the automation system 102 to move away from and/or toward the brake system 100 within a defined task space. The plurality of wheels may be configured to be driven by a motor and/or steered to move the automation system 102 about the task space. The task space may correspond to a movable range or distance that the automation system 102 may move to perform a task, such as grasping and actuating the brake lever 110. It should be noted that, additionally or alternatively, tracks, legs, or other mechanisms may be utilized to propel or move the automation system 102.

The movable base 152 may additionally house electrical components (e.g., one or more processors), which control the operation of the automation system 102. The movable base 152 may also provide for the mounting of other components and/or sub-systems, such the manipulator 150.

The manipulator 150 may be coupled to and/or mounted on the movable base 102, and coupled to the end-effector 160. For example, the end-effector 160 may be coupled to a wrist 162 of the manipulator 150. The manipulator 150 may be actuated to control the positioning and usage of the end-effector 160. The manipulator 150 may be an articulable arm such as a robotic arm and include one or more joints 154-156 interposed between the movable base 102 and the end-effector 160. Each of the one or more joints 154-156 may correspond to an electric motor, hydraulic motor, pneumatic actuators, and/or the like (e.g., motors 310 shown in FIG. 3), which rotates a portion of the manipulator 150. For example, the one or more joints 154-156 may enable the manipulator 150 to move the end-effector 160 towards a target object, such as the brake lever 110. The one or more joints 154-156 are configured to provide movement of the end-effector 160 with respect to the automation system 102 by actuating one or more portions of the manipulator 150. The one or more joints 154-156 may provide rotation of the one or more portions of the manipulator 150 about axes defined by each joint 154-156. For example, the joint 156 may actuate the wrist 162, which rotates and/or moves the end-effector 160.

Figure 2A:
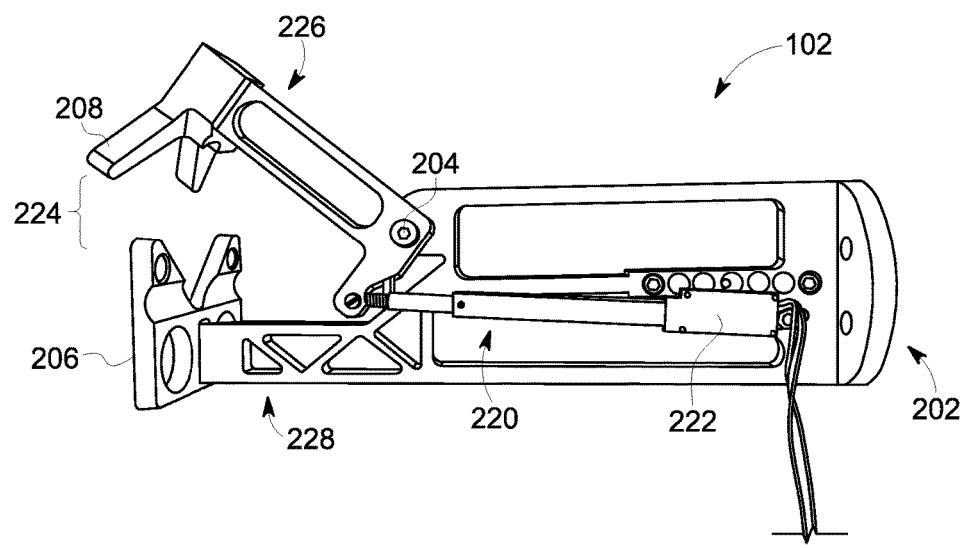
FIG. 2A illustrates a peripheral view of an end-effector with an opening according to one embodiment.
Figure 2B:
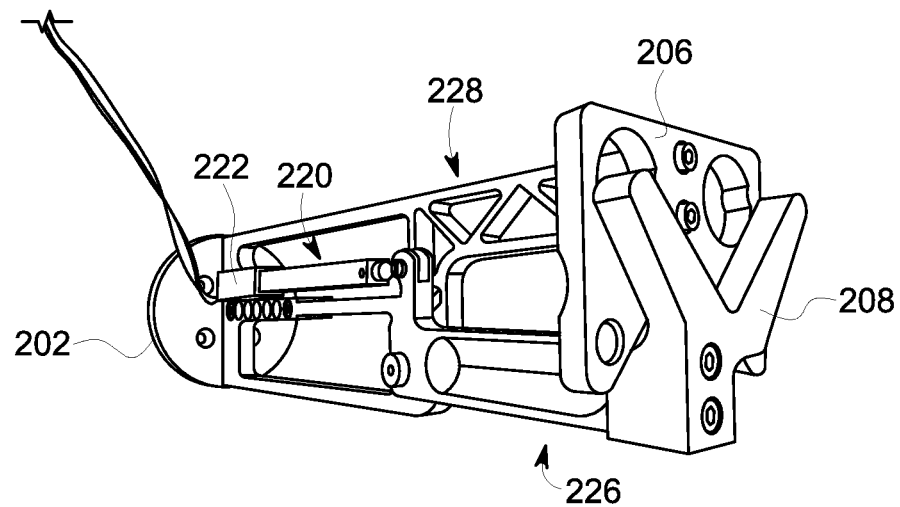
FIG. 2B illustrates a peripheral view of an end-effector without an opening according to one embodiment.

FIGS. 2A-B illustrate a peripheral view of the end-effector 160 according to one embodiment. The end-effector 160 may include a base 202, which is coupled to the wrist 162 of the manipulator 150. The end-effector 160 may be configured to grasp a brake lever for actuation, release, and/or testing of the brake system 100. For example, the end-effector 160 may be a gripper such as an impactive gripper with arms 226-228. Additionally or alternatively, the end-effector 160 may be configured to manipulate a switch, to grasp and hold tools for use on a rail car and/or components for installation to or removal from the rail car, and/or the like.

Each arm 226-228 may include a finger 208 and 206 positioned at a distal end of the arm 226-228, respectively. One or more of the arms 226-228 may move to create an opening 224 between the fingers 206-208 to allow the brake lever 110 to be grasped by the end-effector 160. For example, a cylinder 220 may rotate the arm 226 about a pivot point 204 based on a position of a piston rod controlled by a motor 222. The opening 224 is formed by an opening angle from the pivot point 204 along the arms 226-228. As illustrated in FIG. 2A, the cylinder may rotate the arm 226 such that the finger 208 is positioned away from the finger 206 creating the opening 224. The opening 224 may allow the brake lever 110 to be interposed and positioned between the arms 226-228.

In operation, a size of the opening 224 may allow the end-effector 160 to tolerate errors in positioning the end-effector 160 relative to the break lever 110 for grasping. For example, the brake lever 110 may be received by the end-effector 160 (e.g., positioned between the arms 226-228) when the brake lever 110 is positioned along the opening 224 formed by the arms 226-228. Optionally, a size of the opening 224 may correspond to an error tolerance of the automation system 102. For example, the end-effector 150 may tolerate position errors of the brake lever 110 of at least 5 cm for all axes based on the size of the opening 224. It should be noted that in other embodiments an error tolerance of the automation system 102 may be less than 5 cm (e.g., 2 cm, 4 cm) or greater than 5 cm.

When the brake lever 110 is positioned between the arms 226-228, the cylinder 220 may rotate the arm 226 toward the arm 228 to reduce a size of the opening 224 between the fingers 206-208. The reduced size of the opening 224 may allow the end-effector 160 to grasp the brake lever 110 by restricting movement of the brake lever 110 to remain between the arms 226-228 and inside the fingers 206-208.

Additionally or alternatively, in connection with FIG. 2B, the end-effector 102 may grasp without the opening 224.

FIG. 2B illustrates an alternative grasp of the brake lever 110 with the fingers 206-208 in contact with each other. For example, the end-effector 102 may grasp the brake lever 110 by positioning the brake lever 110 directly adjacent and/or flush with a side of at least one of the arms 226-228 and at least one of the fingers 206-208.

Figure 3:
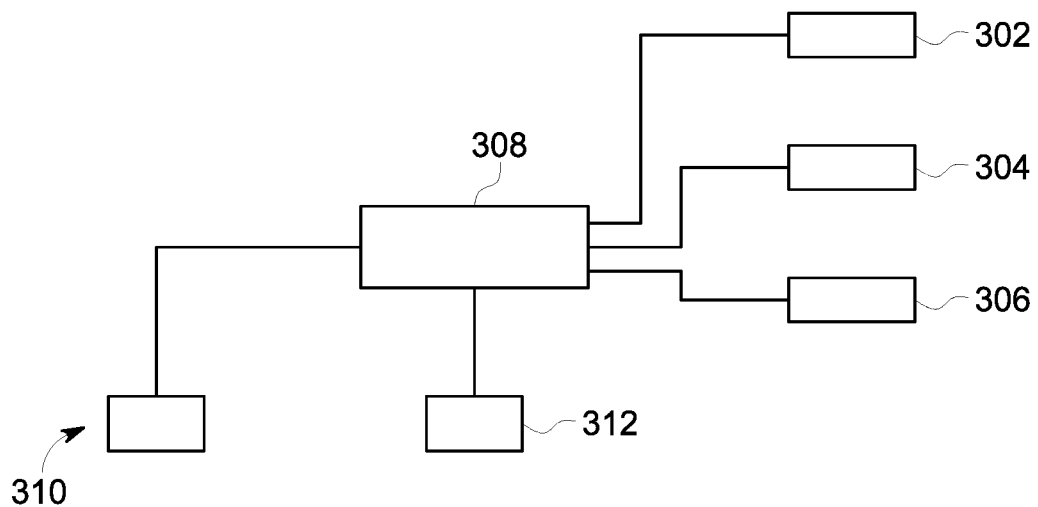
FIG. 3 illustrates a schematic block diagram of the automation system shown in FIG. 1.

FIG. 3 illustrates a schematic block diagram of the automation system 102 shown in FIG. 1. The automation system 102 includes a controller circuit 308 that may direct one or more components of the automation system 102. The controller circuit 308 may be housed within the movable base 152. The controller circuit 308 may represent hardware circuitry that includes and/or is connected with one or more processors (e.g., microprocessors, field programmable gate arrays, integrated circuits, or other electronic logic-based devices). The controller circuit 308 may include and/or be communicatively connected with one or more memories, such as computer hard drives, computer servers, SRAM, RAM, and/or the like. The controller circuit 308 is communicatively coupled with the manipulator 150 (shown in FIG. 1) by one or more wired and/or wireless connections that allow the controller circuit 308 to dictate how and where the one or more portions of the manipulator 150 moves. For example, the controller circuit 308 may control one or more motors 310 located at the one or more joints 154-156 and the piston 220 (e.g., the motor 222) to move and/or actuate portions of the manipulator 150 and the end-effector 160, respectively. The motors 310 may include electric motors, hydraulic motors, pneumatic actuators, and/or the like.

The automation system 102 includes one or more sensors 302-306 that detect operational parameters of the manipulator 150. For example, the manipulator 150 may include a force/torque sensor 302, encoders 304, and a peripheral sensor 306, which is electrically coupled to the controller circuit 308. The one or more sensors 302-306 may each generate one or more electrical signals that are received by the controller circuit 308. It should be noted the electrical signals may be an analog value or a digital value. The one or more electrical signals may include sensory information acquired by the sensor 302-306 corresponding to electrical characteristics of the electrical signal (e.g., amplitude, width, bit value, frequency). The controller circuit 308 may obtain the sensory information at a sampling frequency. For example, the controller circuit 308 may obtain the sensory information from the force/torque sensor 302 and the encoder 304 at 100 Hz. However, it should be noted that in various embodiments the controller circuit 308 may receive the sensory information at greater than 100 Hz (e.g., 1 kHz) or lower than 100 Hz. For example, the controller circuit 308 may obtain the sensory information form the peripheral sensor 306 at 30 Hz.

The force/torque sensor 302 may measure a force applied to one or more portions of the manipulator 150 and/or the end-effector 160. The force/torque sensor 302 may include a force-sensing resistor material that changes a resistance when a force and/or pressure is applied. For example, when a force or pressure is applied to the force/torque sensor 302 electrical characteristics of electrical signals generated by the force/torque sensor 302 may change, and are detected by the controller circuit 308. The force/torque sensor 302 may be positioned approximate to the wrist 162 of the manipulator 150, which may measure a force and/or torque being applied to the end-effector 160, such as by the brake lever 110.

The encoders 304 may be a rotary/linear encoder that converts rotary/linear positions of one or more portions of the manipulator 150 to an analog or digital electronic signal received by the control 308. The encoders 304 may be positioned at each joint 154-156. During and/or after movement of one or more portions of the manipulator 150 by actuating the one or more of the joints 154-156 the encoder values may change. Based on the changes of the encoder values, a kinematic status of the manipulator 150 may be computed. The kinematic status may correspond to a change in position of the manipulator 150, velocity of the one or more portions of the manipulator 150, and/or acceleration of the one or more portions of the manipulator 150.

The peripheral sensor 306 may be an infrared sensor which provides point cloud information. The peripheral sensor 306 may be positioned on the manipulator 150 for example, at the wrist 162. The peripheral sensor 158 may generate RGB and depth data of the environment around the automation system 102, which is received by the controller circuit 308.

Optionally, the controller circuit 308 may receive electrical signals from a radio frequency (RF) subsystem (not shown). The RF subsystem may form bi-directional communication links using a wireless communication protocol (e.g., WiFi, 802.11, Bluetooth, Zigbee) to receive instructions and/or tasks from a remote system. For example, the RF subsystem may be communicatively coupled to a control or dispatch center. The controller circuit 308 may receive instructions from the control center via the RF subsystem on a location of the vehicle having the brake system 100, a location of the brake lever 110, details and/or specifications of the brake lever 110 (e.g., direction to actuate the brake lever 110), and/or the like.

In connection with FIG. 3, the controller circuit 308 may continually monitor the electrical signals generated by the one or more sensors 302-306 in real-time, and adjust a position of the manipulator 150 and/or end-effector 160 based on the electrical signals.

Figure 4:
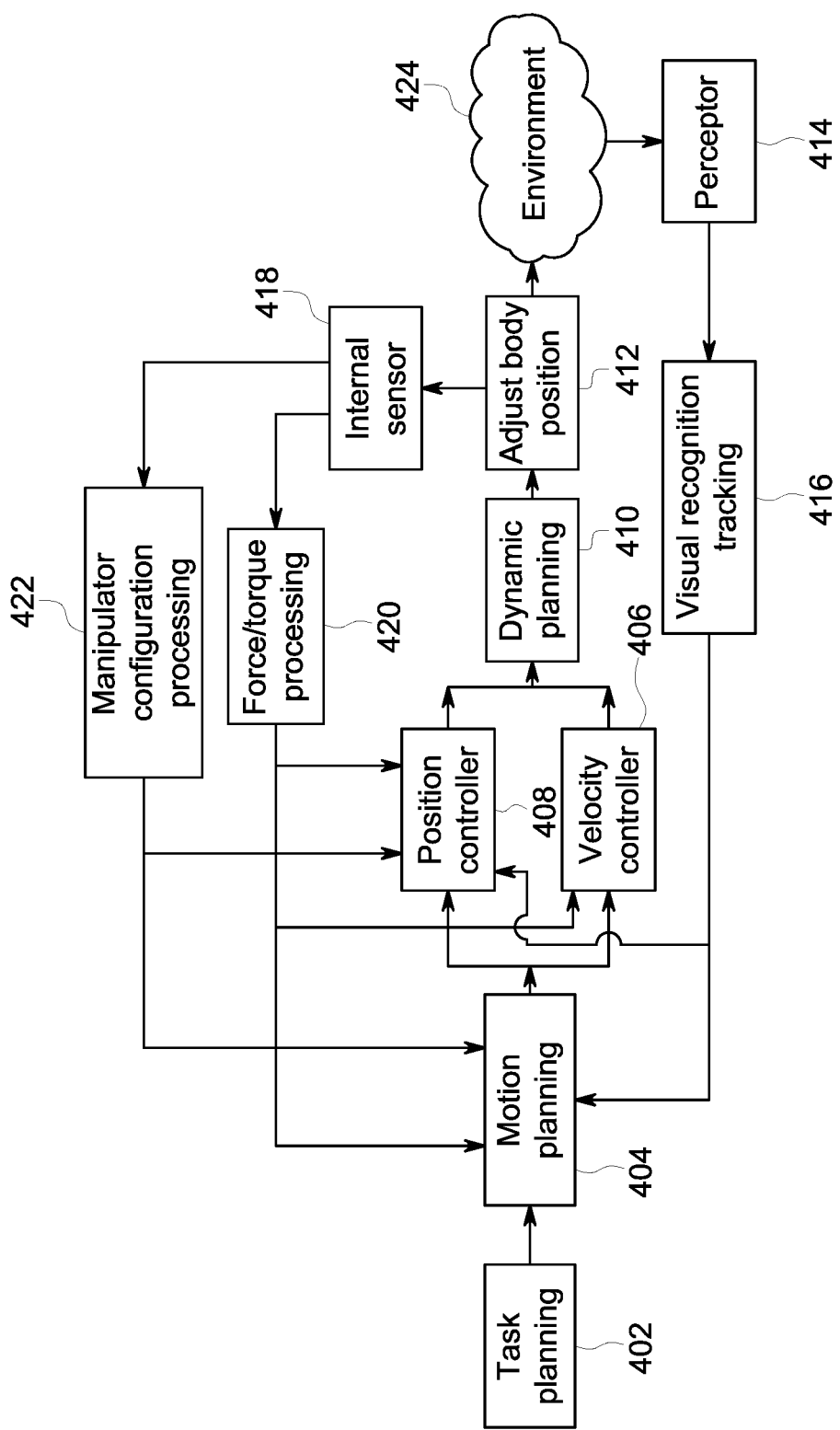
FIG. 4 illustrates a system block diagram of the automation system shown in FIG. 1.

FIG. 4 illustrates a system block diagram of the automation system 102. For example, each of the system blocks (e.g., 402-424) may correspond to one or more operations performed by the controller circuit 308 and/or components of the automation system 102 to grasp a target object, such as the brake lever 110. For example, one or more of the system blocks may correspond to one or more operations performed by the controller circuit 308 executing one or more algorithms stored on a memory. Additionally or alternatively, one or more of the system blocks may include separate hardware (e.g., controllers, processors, graphical processors) to perform at least a portion of the operations as described herein related to the system blocks.

The system block diagram illustrates two control loops of the controller circuit 308 formed by the system blocks. A first control loop corresponding to motion control of the manipulator 150, and a second control loop corresponding to motion control of the arms 226-228 of the end-effector 160. The control loops are based on feedback information received by the controller circuit 308 from the encoders 304 on the manipulator 150, force/torque sensor 302 on the wrist 162 of the manipulator 150, and the peripheral sensor 306.

The task planning 402 may correspond to a task or operation to be performed by the automation system 102. For example, the task planning 402 may instruct the controller circuit 308 on specifications of a target object (e.g., shape of the target object), location of the target object with respect to the manipulator 150 and/or the end-effector 160, and/or the like. In operation, the task planning 402 may be based on visual information received by the automation system 102 from the RF subsystem, a visual sensor (e.g., camera, lidar, sonar, peripheral sensor 306) of the automation system 102, and/or the like.

During the motion planning 404, the controller circuit 308 may generate a motion trajectory. The motion trajectory may include a plurality of via-points corresponding to positions of the manipulator 150 and/or the end-effector 160 ending at a target position. For example, the via-points may include surrounding the target object with the arms 226-228 of the end-effector 160 and slowly closing the arms 226-228 towards each other to grasp the target object at the target position. The target position corresponding to a position of the end-effector 160 relative to the target object that allows the end-effector 160 to grasp the target object.

The motion planning 404 may receive sensory information from the encoders 304 and the force/torque sensor 302, which is represented by the internal sensor 418, and the peripheral sensor 306 represented by the preceptor 414. For example, the motion trajectory generated at the motion planning 404 may be based on the sensory information corresponding to electrical signals of the sensors 302-306.

The electrical signals generated by the sensors 302 and 304 are processed at the manipulator configuration processing 422 and the force/torque processing 420. The manipulator configuration processing 422 may correspond to the operation of the controller circuit 308 to determine a position of the manipulator 150 based on the electrical characteristics of the electrical signal received by the encoders 304. The force/torque sensor 420 may correspond to the operation of the controller circuit 308 to determine various forces being applied to the end-effector 160, which applies a force and/or torque to the wrist 162 of the manipulator 150. For example, when the brake lever 110 is surrounded and/or proximate to the end-effector 160, the brake lever 110 may be contact with a portion of the end-effector 160. The contact with the brake lever 110 applies a force to the end-effector 160, which may be measured as a rotational force or torque at the wrist 162.

The visual recognition tracking 416 may correspond to the operation of the controller circuit 308 performing a segmentation or identification algorithm to visual information received by the peripheral sensor 306 to determine a position of the target object (e.g., the brake lever 110) with respect to the manipulator 150 and/or end-effector 160. The visual recognition and tracking 416 may continuously receive visual information from the preceptor 414 (e.g., the peripheral sensor 306) at 30 Hz, process the visual information, and provide pose and/or position of the target object that may manipulated by the end-effector 160 (e.g., the brake lever 110). Optionally, the controller circuit 308 may utilize a cascade method for the visual recognition tracking to increase processing throughput of the controller circuit 308.

In operation of the visual recognition tacking 416, the controller circuit 308 may execute one or more algorithms to locate the target object within the visual information corresponding to environmental modeling (e.g., area surrounding the automation system 102). For example, the controller circuit 308 may execute a segmentation or identification algorithm stored on memory to identify the brake lever 110 within the visual information acquired by the peripheral sensor 306. The visual information may include RGB data (e.g., image) as well as point cloud information of the environment. The controller circuit 308 may utilize a two-dimensional image processing method (e.g., Viola-Jones object detection framework) to find one or more possible locations within the visual information that includes the target object (e.g., the brake lever 110). Based on the one or more possible locations, the controller circuit 308 may execute a three-dimensional segmentation method utilizing the point cloud data to segment the target object within the one or more possible areas. Optionally, the controller circuit 308 may apply a learning based algorithm (e.g., Adaptive Boosting, Histogram of Oriented Gradients) to filter the one or more possible locations.

The motion trajectory generated at the motion planning 404 may include velocity and acceleration values for each via-point. For example, at each via-point the one or more joints 154-156 of the manipulator 150 and/or the end-effector 160 may be positioned at a different position. The via-points may incorporate environmental modeling results based on the task planning 402 and environmental modeling to move the end-effector 160 towards the target object (e.g., the brake lever 110). For example, the via-points may be a series of successive movements by the manipulator 150 and the end-effector 160 to reach a target position. The controller circuit 308 may drive the motors 310 based on the velocity and acceleration values to position the manipulator 150 and/or the end-effector 160 to each successive via-point.

In operation, the motion planning 404 may generate via-points that balance the force on the arms 226-228 and minimize the torque on the wrist 162 of the manipulator 162. For example, based on a position of the target object the motion planning 404 may generate a motion trajectory with a target position having a smaller force and/or torque on the wrist 162 relative to other candidate motion trajectories. Additionally or alternatively, in connection with FIGS. 2A-B, the force and/or torque corresponding to the position and/or orientation of the end-effector 160 may be based on the grasping style for the target object. It may be noted that the force and torque measured by the force/torque sensor 302 is associated with the motion control of the end-effector 160.

For example, FIG. 2A may illustrate a Type 1 grasping style. For the Type 1 grasping style, the motion planning 404 may generate via-points that include the arms 226-228 of the end-effector 160 closing slowly (e.g., reducing a size of the opening 224) when it touches the surface of the target object. As shown in Equations 1 and 2, the displacement motion along an x and/or y direction of the end-effector 160 and/or the manipulator 150 may be proportional to the forces measured by the force/torque sensor 402. The variables Kx and Ky are constants based on the force/torque sensor 302 and/or characteristics of the manipulator 150.

$$\dot{x} = -K_x F_x - \int F_x \qquad \text{(Equation 1)}$$

$$\dot{y} = -K_y F_y - \int F_y \qquad \text{(Equation 2)}$$

The motion trajectory generated by the motion planning 404 may be selected based on a horizontal and vertical force (Fx, Fy) with respect to the force/torque sensor 302, and a torque (Tx, Ty, Tz) of the wrist 162 with respect to the force/torque sensor 302. For example, the one or more of the via-points forming the motion trajectory may position and/or orient the end-effector 160 to have a distributed force with a smaller Fx, Fy, and torque relative to other motion trajectories. As shown in Equations 3-5, the orientation of the end-effector 160 corresponding to a roll (e.g., variable r), a pitch (e.g., variable p), and yaw (e.g., variable $y_w$) may be proportional to the torque measured by the force/torque sensor 402. The variables Kp, Kyw, and Kr are constants based on the force/torque sensor 302 and/or characteristics of the manipulator 150.

$$\dot{p}=-K_pT_x-\int T_x \quad \text{(Equation 3)}$$

$$\dot{y}=-K_{yw}T_y-\int T_y \quad \text{(Equation 4)}$$

$$\dot{r}=-K_rT_z-\int T_z \quad \text{(Equation 5)}$$

In another example, FIG. 2B may illustrate a Type 2 grasping style. For the Type 2 grasping style, the motion planning 404 may generate via-points that position the target object directly adjacent and/or flush with a side of at least one of the arms 226-228 and at least one of the fingers 206-208. The motion trajectory generated by the motion planning 404 may be selected based on a torque (Tz) along a z-axis normal to the base 202 (shown in FIG. 2). For example, the one or more of the via-points forming the motion trajectory may position and/or orient the end-effector 160 to have a smaller Tz relative to other motion trajectories.

In operation, as the controller circuit 308 transitions the manipulator 150 and the end-effector 160 along the motion trajectory (e.g., succeeding via-points) corresponding to the adjust body position 412 the controller circuit 308 may adjust future via-points in real-time. For example, the controller circuit 308 may adjust the future via-points based on feedback from the one or more sensors 302-306 to assure the force on the arms 226-228 is balanced and/or minimize the torque on the wrist 162 of the manipulator 162.

The position controller 408 and the velocity controller 406 may correspond to operations of the controller circuit 308 that adjust the one or more future via-points generating an updated motion trajectory. Based on the updated motion plan, the controller circuit 308 may generate drive signals for the motors 310 corresponding to operations performed at dynamic planning 410. The generated drive signals may adjust a position of the manipulator 150 and/or the end-effector 160. For example, the updated motion trajectory generated by the position controller 408 and the velocity controller 406 may adjust a position and/or orientation of the end-effector 160 to enable the automation system 102 to properly grasp the brake lever 110 without and/or reducing a change of damaging the automation system 102. It may be noted that a frequency of the updated motion trajectory or position control rate may be based on the sampling frequency of the controller circuit 308. For example, the controller circuit 308 may adjusts the motion of the trajectory at a rate of 10 to 100 Hz.

The position controller 408 may be based on a closed-loop using sensory information corresponding to positions of the automation system 102 (e.g., the manipulator 150, the end-effector 160) and the environment surrounding the automation system 102 (e.g., the task space). In operation, the position controller 408 may receive a desired position of the manipulator 150 and/or the end-effector 160 corresponding to a succeeding via-point, and output a drive signal instructing the manipulator 150 and/or the end-effector 160 to move to a position (e.g., the succeeding via-point, an adjusted succeeding via-point). The position controller 408 may correspond to a control algorithm executed by the controller circuit 308 to minimize the error between the desired position and the actual positions of the via-points. For example, the position controller 408 may include a proportional-integral-derivative controller (PID controller).

In operation, the PID controller may calculate an error value. The error value representing a difference between a measured process variable and a desired set point (e.g., via points of the motion trajectory). The measured process variable corresponding to the sensory information received by the position controller 408. For example, the desired set point may correspond to a relative force (e.g., Fx, Fy), and/or torque (e.g., Tx, Ty, Tz) that are based on the motion trajectory determined during the motion planning 404. The PID controller may adjust the future via-points (e.g., points of the motion trajectory not reached by the manipulator 150 and/or the end-effector 160) to reduce the error value.

For example, the measured process variable may correspond to a force measurement of Fx greater than Fy. The PID controller may determine an error value corresponding to the imbalance in the force. The PID controller may determine an adjusted via-point, which may adjust a position of the end-effector 160 and/or the manipulator 150 to reduce the Fx to be approximately the same as Fy.

The electrical signals generated by the sensors 302 and 304 are processed at the manipulator configuration processing 422 and the force/torque processing 420. The manipulator configuration processing 422 may correspond to the operation of the controller circuit 308 to determine a position of the manipulator 150 based on the electrical characteristics of the electrical signal received by the encoders 304. For example, the manipulator configuration processing 422 may determine the forward kinematics (e.g., change in position) of the manipulator 150. The force/torque sensor 420 may correspond to the operation of the controller circuit 308 to determine various forces being applied to the end-effector 160, which applies a force and/or torque to the wrist 162 of the manipulator 150. For example, when the brake lever 110 is surrounded and/or proximate to the end-effector 160, the brake lever 110 may be contact with a portion of the end-effector 160. The contact with the brake lever 110 applies a force to the end-effector 160, which may be measured as a rotational force or torque at the wrist 162.

The visual recognition tracking 416 may correspond to the operation of the controller circuit 308 performing a segmentation or identification algorithm to visual information received by the peripheral sensor 306 to determine a position of the target object (e.g., the brake lever 110) with respect to the manipulator 150 and/or end-effector 160. The visual recognition and tracking 416 may continuously receive visual information from the preceptor 414 (e.g., the peripheral sensor 306) when the manipulator 150 and/or the end-effector 160 are moving. Optionally, the visual recognition and tracking 416 may use the forward kinematics determined by the manipulator configuration processing 422. For example, the forwards kinematics of the manipulator 150 may be sued to determine an overall position of the manipulator 150. Utilizing the position of the manipulator 150, the visual recognition tacking 416 may perform a three dimensional segmentation on the visual information to determine a position of the target object (e.g., the brake lever 110).

The velocity controller 406 may be based on a closed-loop using sensory information corresponding to positions of the automation system 102 (e.g., the manipulator 150, the end-effector 160). In operation, the velocity controller 406 may receive a desire velocity of the manipulator 150 and/or the end effector 160, and output a velocity compensation signal. Based on the velocity compensation signal, the velocity control 406 may output a velocity drive signal for the manipulator 150 and/or the end-effector 160.

This velocity controller 406 may include two parts: a first outer loop to calculate the velocity compensation signal, and a second outer loop for generating the drive signal. Optionally, the first loop may be configured by a user. The first outer loop may utilize the position of the manipulator 150 and/or the end-effector 160 and the succeeding via-point to calculate an error value. Based on the error value, the velocity controller 406 may generate a velocity compensation signal. The velocity compensation signals may be configured to adjust a velocity of the manipulator 150 and/or the end-effector 160 to reduce the error value.

The dynamic planning 410 may correspond to one or more operations of the controller circuit 308, which convert the drive signals generated by the position controller 408 and the velocity controller 406 into torque values for each of the joints 154-156 of the manipulator 150. The dynamic planning 410 may include a robotic dynamics model. The robotic dynamic model may correspond to one or more algorithms that define how the manipulator 150 moves in respond to the torques applied by the joints 154-156. For example, based on the robotic dynamic model and the drive signals corresponding to a velocity and/or position of the manipulator 150, the controller circuit 308 may determine an applied torque to be applied to each of the joints 154-156.

In operation, the dynamic planner 408 may perform a hybrid motion and force planning component by defining the forces separately in the joint space (e.g., torque applied to the joints 154-156) and the task space (e.g., the drive signals received by the velocity controller 406 and the position controller 408). For example, the dynamic planner 408 may determine the motion of the manipulator 150 and the force simultaneously by taking the desired motion and forces both in task space and joint space into consideration. The outcome of the planning may optimize the results both in the task space and the joint space.

In one embodiment an automation system includes an end-effector having a plurality of arms. The end-effector is configured to grasp a target object based on a motion trajectory. The automation system may include a manipulator having one or more joints. The end-effector is coupled to the manipulator. The one or more joints are configured to move the end-effector relative to the target object based on the motion trajectory. The automation system may also include a force/torque (F/T) sensor that acquires F/T data associated with the end-effector, and a controller circuit receiving the F/T data. The controller circuit may adjust the motion trajectory based on the F/T data.

In one aspect, the target object of the automation system is a brake lever.

In one aspect, the controller circuit of the automation system adjusts the motion of the trajectory at a rate of ten to one hundred hertz.

In one aspect, the controller circuit of the automation system receives the F/T data at a rate of one kilohertz.

In one aspect, the automation system further includes a peripheral sensor that acquires visual information of a task space. Optionally, the controller circuit of the automation system may receive the visual information and adjusts the motion trajectory based on the visual information.

In one aspect, the automation system further includes a peripheral sensor that acquires visual information of a task space. Optionally, the controller circuit of the automation system defines the motion trajectory based on the visual information In one aspect, the plurality of arms of the automation system form an opening based on the motion trajectory. The opening may be configured to receive the target object within the end-effector.

In one aspect, at least a portion of the F/T data is acquired when at least one of the manipulator or the end-effector is changing a position.

In one aspect, the F/T data includes a force component and a torque component. Optionally, the controller circuit of the automation system may adjust the motion trajectory to reduce at least one of the force component or the torque component of the F/T data based on target object.

In one aspect, the automation system further includes a movable base housing the controller circuit, wherein the manipulator is mounted on the movable base.

In one embodiment a method for controlling an automation system includes calculating a motion trajectory of a manipulator and an end-effector. The end-effector configured to grasp a target object. The motion trajectory defines successive positions of the manipulator and the end-effector along a plurality of via-points toward the target object. The method may further include acquiring force/torque (F/T) data from an F/T sensor associated with the end-effector, and adjusting the motion trajectory based on the F/T data.

In one aspect, the target object is a brake lever.

In one aspect, the motion trajectory further defines a force distribution and a torque predetermined value. Optionally, the method may include calculating an error value based on the F/T data and at least one of the force distribution or the torque predetermined value. Optionally, the motion trajectory is adjusted to reduce the error value. Optionally, the error value is further based on the target object.

In one aspect, the method further includes acquiring visual information of a task space from a peripheral sensor. The motion trajectory may further be adjusted based on the visual information.

In one aspect, the method may further comprising acquiring visual information of a task space from a peripheral sensor. The motion trajectory may be defined based on the visual information.

In one aspect, at least a portion of the FIT data is acquired when at least one of the manipulator or the end-effector is moving to a succeeding position.

In one aspect, the FIT data includes a force component and a torque component. The motion trajectory may be adjusted to reduce at least one of the force component or the torque component of the FIT data based on target object.

In one aspect, the FIT data is associated with a force applied to the end-effector by the target object.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to those of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable any person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods for communicating data in a vehicle consist, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. An automation system comprising:
    an end-effector comprising a plurality of arms, wherein the end-effector is configured to grasp a brake lever by one or more of the plurality of arms based on a motion trajectory and feedback from at least one sensor to one or more of position or orient the end-effector;
    a manipulator comprising one or more joints, the end-effector coupled to the manipulator, wherein the one or more joints are configured to move the end-effector relative to the brake lever based on the motion trajectory;
    a force/torque (F/T) sensor coupled to the end-effector and configured to acquire F/T data associated with the end-effector; and
    a controller circuit coupled to the F/T sensor and configured to receive the F/T data, wherein the controller circuit adjusts the motion trajectory based on the F/T data, and wherein the controller circuit is further coupled to the end-effector and the manipulator and configured to dynamically control amount of forces exerted along horizontal, vertical directions and torque on at least one of the end-effector and the manipulator based on an adjusted motion trajectory, and wherein the controller is configured to determine a confidence value or an index based on a difference between predicted values and the force/torque F/T data acquired from the F/T sensor for validating release of the brake lever.

2. The automation system of claim 1, wherein the controller circuit adjusts the motion trajectory at a rate of ten to one hundred hertz.

3. The automation system of claim 1, wherein the controller circuit receives the F/T data at a rate of one kilohertz.

4. The automation system of claim 1, further comprising a peripheral sensor that acquires visual information of a task space, the controller circuit receiving the visual information and adjusts the motion trajectory based on the visual information.

5. The automation system of claim 1, further comprising a peripheral sensor that acquires visual information of a task space, wherein the controller circuit defines the motion trajectory based on the visual information.

6. The automation system of claim 1, wherein the plurality of arms form an opening based on the motion trajectory, the opening configured to receive the brake lever within the end-effector by positioning the brake lever between the plurality of arms.

7. The automation system of claim 1, wherein at least a portion of the F/T data is acquired when at least one of the manipulator or the end-effector is changing a position.

8. The automation system of claim 1, further comprising a movable base housing the controller circuit, wherein the manipulator is mounted on the movable base.

9. A method for controlling an automation system, the method comprising:
    calculating, by a controller circuit, a motion trajectory of a manipulator and an end-effector, the end-effector configured to grasp a brake lever, wherein the motion trajectory defines successive positions of the manipulator and the end-effector along a plurality of via-points toward the brake lever;
    acquiring force/torque (F/T) data from a F/T sensor associated with the end-effector;
    adjusting, by the controller circuit, the motion trajectory based on the F/T data;
    dynamically controlling, by the controller circuit, amount of forces exerted along horizontal, vertical directions and torque on at least one of the end-effector and the manipulator based on an adjusted motion trajectory; and
    determining a confidence value or an index based on a difference between predicted values and the force/torque F/T data acquired from the F/T sensor for validating release of the brake lever.

10. The method of claim 9, wherein the motion trajectory further defines a force distribution and a torque predetermined value.

11. The method of claim 10, further comprising calculating an error value of the error based on the F/T data and at least one of the force distribution or the torque predetermined value, wherein the motion trajectory is adjusted to reduce the error value.

12. The method of claim 11, wherein the error value is further based on the brake lever.

13. The method of claim 9, further comprising acquiring visual information of a task space from a peripheral sensor, wherein the motion trajectory is further adjusted based on the visual information.

14. The method of claim 9, further comprising acquiring visual information of a task space from a peripheral sensor, wherein the motion trajectory is defined based on the visual information.

15. The method claim 9, wherein at least a portion of the F/T data is acquired when at least one of the manipulator or the end-effector is moving to a succeeding position.

16. The automation system of claim 1, wherein the controller circuit is further configured to control an orientation comprising a roll, pitch, and yaw of the end effector based on the adjusted motion trajectory.

17. The method of claim 9, further comprising controlling, by the controller circuit, an orientation comprising a roll, pitch, and yaw of the end effector based on the adjusted motion trajectory.

* * * * *